United States Patent
Jhao (10) Patent No.: US 12,330,680 B2
(45) Date of Patent: Jun. 17, 2025

(54) VEHICLE POSITIONING DEVICE AND VEHICLE POSITIONING APPLICATION SYSTEM

(71) Applicants: INVENTEC (PUDONG) TECHNOLOGY CORPORATION, Shanghai (CN); INVENTEC CORPORATION, Taipei (TW)

(72) Inventor: Guan-Jie Jhao, Taipei (TW)

(73) Assignees: INVENTEC (PUDONG) TECHNOLOGY CORPORATION, Shanghai (CN); INVENTEC TECHNOLOGY CORPORATION, Taipei (TW)

( * ) Notice: Subject to any disclaimer, the term of this patent is extended or adjusted under 35 U.S.C. 154(b) by 161 days.

(21) Appl. No.: 18/244,707

(22) Filed: Sep. 11, 2023

(65) Prior Publication Data

US 2024/0300522 A1    Sep. 12, 2024

(30) Foreign Application Priority Data

Mar. 9, 2023   (CN) .......................... 202310226576.9

(51) Int. Cl.
*B60W 60/00* (2020.01)
*G01S 5/00* (2006.01)
*G01S 5/02* (2010.01)

(52) U.S. Cl.
CPC ......... *B60W 60/001* (2020.02); *G01S 5/0054* (2013.01); *G01S 5/0289* (2013.01); *B60W 2520/10* (2013.01); *B60W 2556/45* (2020.02); *G01S 2205/002* (2013.01)

(58) Field of Classification Search
None
See application file for complete search history.

(56) References Cited

U.S. PATENT DOCUMENTS

| | | | |
|---|---|---|---|
| 2003/0187704 A1* | 10/2003 | Hashiguchi | G06Q 40/08 705/4 |
| 2005/0068225 A1* | 3/2005 | Inoue | G01S 3/50 455/39 |
| 2007/0129879 A1* | 6/2007 | Fedora | G01S 19/15 342/357.53 |
| 2014/0309789 A1* | 10/2014 | Ricci | G06Q 20/308 700/276 |
| 2021/0061326 A1* | 3/2021 | Hanczor | B61L 25/028 |
| 2022/0204026 A1* | 6/2022 | Kim | B60W 60/0015 |
| 2022/0225056 A1* | 7/2022 | Glover | H04W 4/46 |
| 2024/0049109 A1* | 2/2024 | Agrawal | H04W 4/40 |

* cited by examiner

*Primary Examiner* — Daniel L Greene
(74) *Attorney, Agent, or Firm* — Maschoff Brennan (57) ABSTRACT

A vehicle positioning device, comprises a wireless communicator, at least one ultra-wideband transceiver and a signal processor. The ultra-wideband transceiver is disposed in a vehicle and configured to receive a pulse signal with source information from another ultra-wideband transceiver. The signal processor is connected to the at least one ultra-wideband transceiver and a speed measuring device of the vehicle, and configured to generate a position information according to the signal value of the pulse signal and the source information and transmit the position information and a vehicle speed information obtained from the speed measuring device through the wireless communicator to a server, and receive a driving information associated with the position information and the vehicle speed information from the server through the wireless communicator.

10 Claims, 10 Drawing Sheets

VEHICLE POSITIONING DEVICE AND VEHICLE POSITIONING APPLICATION SYSTEM

CROSS-REFERENCE TO RELATED APPLICATIONS

This non-provisional application claims priority under 35 U.S.C. § 119(a) on Patent Application No(s). 202310226576.9 filed in China on Mar. 9, 2023, the entire contents of which are hereby incorporated by reference.

BACKGROUND

1. Technical Field

This disclosure relates to a vehicle positioning device and positioning application system, particular to a vehicle positioning device and vehicle positioning application system using ultra-wideband (UWB) positioning technology.

2. Related Art

When vehicles are driving on the expressway or under a poor traffic condition, traffic accidents are easily caused due to sudden deceleration and braking of front cars that the reaction time of the vehicles behind is not enough, or there are some vehicles driving too slowly and occupying the inner lane, which often causes the phenomenon of vehicle back-blocking. After switching lanes, drivers often finds that there is an accident on the lane ahead, and then brakes in emergency. All kinds of driving situations make passers-by in danger, and also result in increasing psychological pressure and anxiety for other drivers.

SUMMARY

Accordingly, this disclosure provides a vehicle positioning device and vehicle positioning application system.

According to one or more embodiment of this disclosure, a vehicle positioning device includes a wireless communicator, at least one ultra-wideband (UWB) transceiver and a signal processor. The UWB transceiver is disposed in a vehicle and configured to receive a pulse signal with source information from another UWB transceiver. The signal processor is connected to the at least one UWB transceiver and a speed measuring device of the vehicle, and is configured to generate position information according to the signal value of the pulse signal and the source information, transmit the position information and vehicle speed information obtained from the speed measuring device to a server through the wireless communicator, and receive driving information associated with the position information and the vehicle speed information from the server through the wireless communicator.

According to one or more embodiment of this disclosure, a vehicle positioning application system includes a plurality of road positioning devices, a plurality of vehicle positioning devices and a server. The plurality of road positioning devices are disposed on a road, and each of the plurality of road positioning devices includes a first UWB transceiver. The plurality of vehicle positioning devices are disposed in a plurality of vehicles, respectively, and each of the plurality of vehicle positioning devices includes: a wireless communicator, at least one second UWB transceiver and a signal processor. The at least one second UWB transceiver is configured to receive a pulse signal with source information from at least one of the first UWB transceiver and another second UWB transceiver. The signal processor is connected to the at least one second UWB transceiver and a speed measuring device of the vehicle, and is configured to generate position information according to the signal value of the pulse signal and the source information, output the position information and vehicle speed information obtained from the speed measuring device through the wireless communicator. The server is connected to the plurality of vehicle positioning devices, and is configured to generate driving information corresponding to each of the plurality of vehicle positioning devices according to the position information and the vehicle speed information of the plurality of vehicle positioning devices, and transmit the driving information to the signal processor through the wireless communicators of each of the plurality of vehicle positioning devices.

In view of the above description, the vehicle positioning device of the present disclosure can use the UWB transceiver installed in the vehicle to communicate with the vehicle itself and another UWB transceiver external to the vehicle to obtain accurate position information, and transmit the position information and vehicle speed information to the server for calculation to obtain accurate traffic conditions and corresponding driving information. The vehicle positioning application system of the present disclosure can use the UWB transceivers installed in the vehicles to provide the position information between vehicles, or/and provide the position information of the vehicle on the road through the UWB transceiver of the vehicle and the UWB transceiver on the road, so that after the server receives the vehicle speed information of each vehicle and the position information mentioned above, it can perform big data calculations to obtain the traffic conditions on the lane and generate corresponding driving information to transmit back to the vehicle. In this way, through the high-precision UWB transceiver (about 10-30 cm precision), the system can distinguish the traffic conditions of different lanes, and then indicate the driving route with better road conditions to the driver to reduce traffic jams or traffic accidents. Furthermore, by using an UWB transceiver with small size and low power consumption, it can be easily installed in various positions of the vehicle and reduce the power consumption of the positioning device.

The above description of the present disclosure and the following description of the implementation are used to demonstrate and explain the spirit and principle of the present disclosure, and provide a further explanation of the claims of the present disclosure.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present disclosure. The following embodiments further illustrate various aspects of the present disclosure, but are not meant to limit the scope of the present disclosure.

Figure 1:
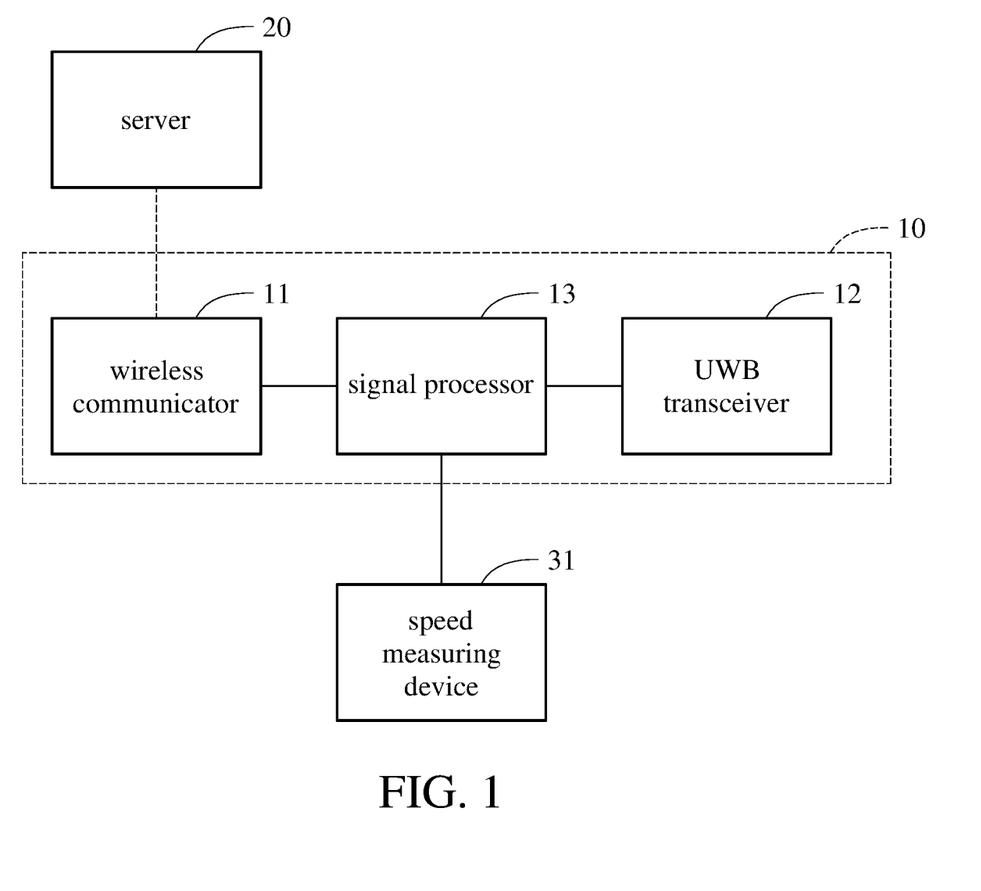
FIG. 1 is a functional block diagram of a vehicle positioning device and related devices according to an embodiment of the present disclosure.

Please refer to FIG. 1 which is a functional block diagram of a vehicle positioning device and related devices according to an embodiment of the present disclosure. As shown in FIG. 1, a vehicle positioning device 10 includes a wireless communicator 11, at least one ultra-wideband (UWB) transceiver 12 and a signal processor 13. The UWB transceiver 12 is disposed in a vehicle and configured to receive a pulse signal with source information from another UWB transceiver. The signal processor 13 is connected to the at least one UWB transceiver 12 and a speed measuring device 31 of the vehicle, and is configured to generate position information according to the signal value of the pulse signal and the source information, transmit the position information and vehicle speed information obtained from the speed measuring device 31 to a server 20 through the wireless communicator 11, and receive driving information associated with the position information and the vehicle speed information from the server 20 through the wireless communicator 11.

In the present embodiment, the wireless communication device 11 can be a communication device using the global positioning system (GPS) communication protocol, 5G technology or long term evolution technology (LTE), and is signally connected to the server 20, wherein the server 20 can be a cloud server. The UWB transceiver 12 can be a signal transceiver installed in the positioning device on the vehicle, and is configured to transmit UWB signals to be received by the UWB transceivers 12 on other vehicles, or receive UWB signals from the UWB transceivers 12 on other vehicles. In the present disclosure, the UWB transceiver 12 uses UWB signals to perform UWB positioning. The UWB signal has a wider bandwidth and a narrower pulse width compared to ordinary radio frequency signals, and can be used to transmit a relatively large amount of data with less power consumption (about several hundred microwatts), thus it can reduce the time delay (latency) of the data transmission process, and the UWB transceiver 12 also has a small size and is convenient to be installed on the vehicle. Compared with ordinary Bluetooth or wireless network technologies that use received signal strength information (RSSI) for positioning, UWB positioning technology uses time of flight (ToF) technology to directly measure the optical path difference between the transmitting end and the receiving end to obtain the distance between the two ends. Therefore, the positioning accuracy of UWB positioning technology can reach about 10-30 cm.

In the present embodiment, a UWB transceiver on one vehicle can transmit a pulse signal with source information to a UWB transceiver on another vehicle, or a UWB transceiver on one vehicle can receive a pulse signal with source information from a UWB transceiver on another vehicle. The source information above includes vehicle identity information for the vehicle. The signal processor 13 can be a microprocessor, and can also be referred to as a vehicle gateway, which has the functions of data transfer and integration as a transmission interface for various signals. In one implementation, the signal processor 13 is connected to the speed sensor of the vehicle itself and the UWB transceiver 12 to receive the above-mentioned pulse signal with source information, so as to generate position information according to the signal value of the pulse signal and the source information, and obtain the current speed of the vehicle. Specifically, the position information indicates a time difference according to the time-of-flight (ToF) technology, or a relative distance converted from the time difference, and the position information along with the source information can be relative distance information to a specific vehicle. Further, when the UWB transceivers of multiple vehicles exchange signals with each other to generate multiple pieces of position information, the server 20 that collects the multiple pieces of position information can use triangulation to calculate the relative position relationship between the multiple vehicles.

The signal processor 13 can transmit the above-mentioned position information and vehicle speed information to the server 20 through the wireless communicator 11, and can also receive a piece of driving information associated with the position information and vehicle speed information from the server 20 through the wireless communicator 11. For example, the server 20 can calculate and generate driving information according to the position information and vehicle speed information, and transmit the driving information to the vehicle through the wireless communicator 11. For example, the driving information includes instructions of changing the driving direction, changing the vehicle speed, etc., and the algorithm used may be, for example, the algorithm of a general navigation system. Furthermore, the cloud server can receive position information and vehicle speed information from a collection of multiple vehicles, so the information of each vehicle can be integrated to generate driving information for different vehicles. For example, for two vehicles, one behind another, that are too close together, the cloud server can transmit driving information of indicating acceleration to the front vehicle, and transmit driving information of indicating deceleration to the vehicle behind.

Figure 2:
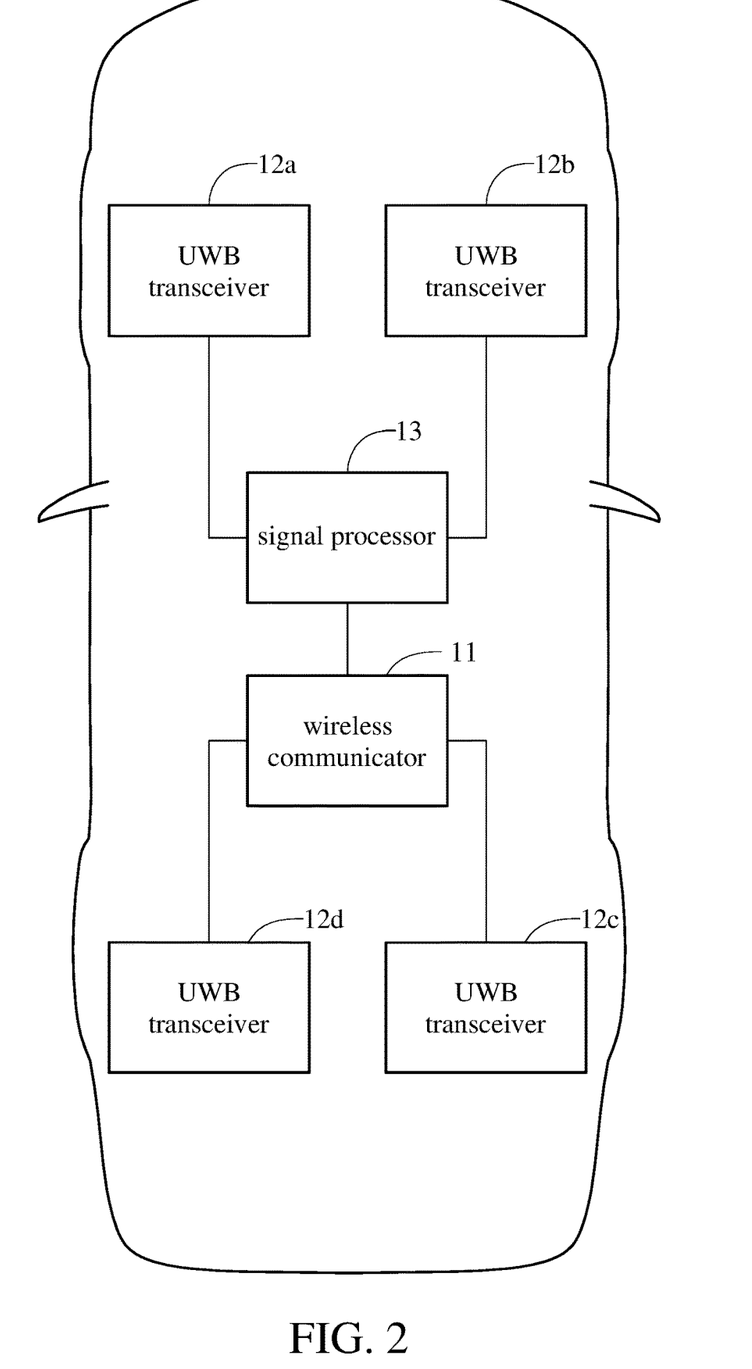
FIG. 2 is a schematic diagram illustrating the configuration of a vehicle positioning device on a vehicle according to another embodiment of the present disclosure.

Please refer to FIG. 2 which is a schematic diagram illustrating the configuration of a vehicle positioning device on a vehicle according to another embodiment of the present disclosure. In the present embodiment, the vehicle positioning device installed on the vehicle includes a wireless communicator 11, a signal processor 13, and four UWB transceivers 12a, 12b, 12c, and 12d, among which the four UWB transceivers are respectively disposed on four corners of the vehicle (both sides at the front end and rear end). By installing UWB transceivers at the four corners of the vehicle, the vehicle positioning device can effectively receive signals from different directions or transmit signals toward different directions. For example, the UWB transceivers 12a and 12b can be used to receive vehicle position information from the front lane, the UWB transceivers 12c and 12d can be used to receive vehicle position information from the rear lane, and UWB transceivers 12a and 12d can be used to receive vehicle position information from the left lane, the UWB transceivers 12b and 12c can be used to receive vehicle position information from the right lane. Specifically, when the UWB transceivers 12a, 12b, and 12d of the vehicle (A) receive pulse signals from the same vehicle (B), the signal processor 13 can identify the three pulse signals as a group of signals according to the same source information (vehicle identity information) received by the three UWB transceivers mentioned above, and calculate the distance and direction between vehicle A and vehicle B (for example, B is in the left front lane of A). In addition, the present disclosure does not limit the install position and quantity of the UWB transceivers. For example, in other embodiments, the UWB transceivers can be installed at the front, rear, left, and right sides of the vehicle, and the quantity of installations on each side can be multiple.

Figure 3:
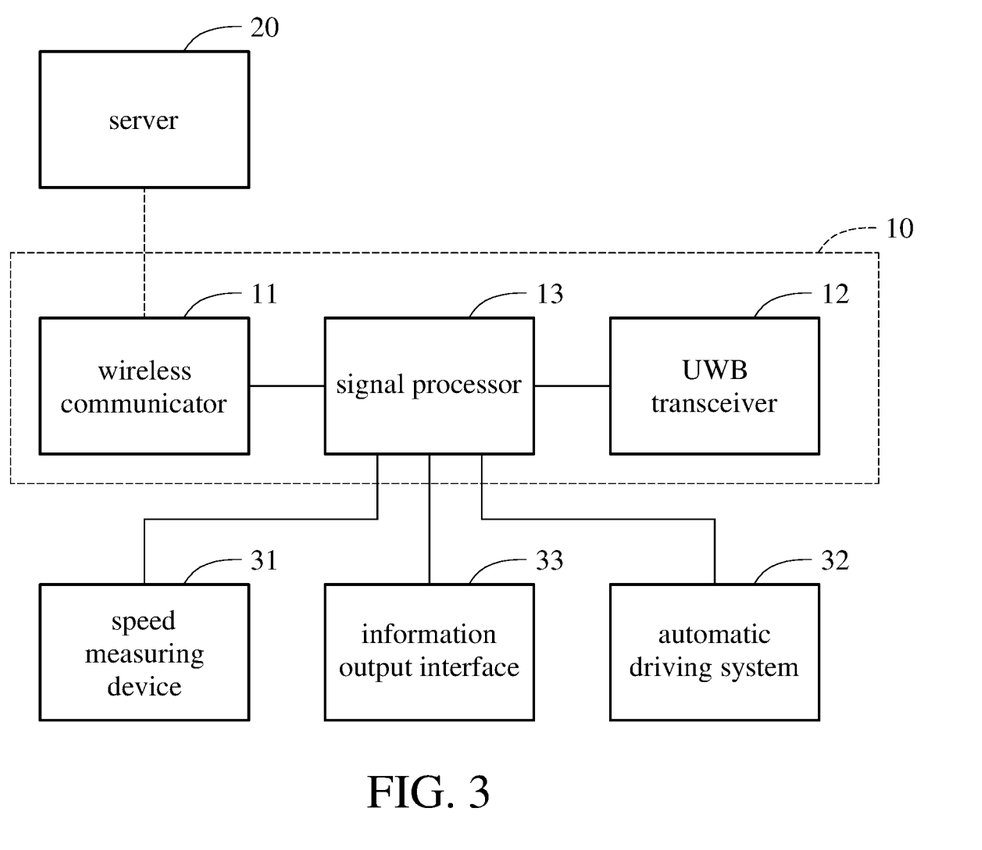
FIG. 3 is a functional block diagram of a vehicle positioning device and related devices according to yet another embodiment of the present disclosure.

Please refer to FIG. 3 which is a functional block diagram of a vehicle positioning device and related devices according to yet another embodiment of the present disclosure. In the present embodiment, the wireless communicator 11, the UWB transceiver 12 and the signal processor 13 of the vehicle positioning device 10 have functions similar to those of the above-mentioned embodiments, and the wireless communicator 11 is also signally connected to the server 20, and the repeated description is omitted herein. Different from the previous embodiments, the signal processor 13 is not only connected to the speed measuring device 31 of the vehicle, but also connected to an automatic driving system 32 and an information output interface 33 of the vehicle, so as to control the automatic driving system 32 according to the driving information and generate a notification according to the driving information, and output the notification to the driver through the information output interface 33. The automatic driving system 32 and the information output interface 33 can be an automatic driving system and a display interface for general vehicles, and the vehicle positioning device and system in the present embodiment are not limited to automatic driving systems that can only be applied to a specific level of automatic driving. For example, for vehicles without automatic driving function, the signal processor 13 can transmit the notification of driving information to the information output interface 33; for vehicles with assisted driving functions, the automatic driving system 32 can assist in correcting the lane departure of the vehicle according to the driving information; for vehicles with certain level automatic driving functions, the automatic driving system 32 can control the vehicle according to the driving information to respond to changes in road conditions or traffic flow, such as braking and acceleration and deceleration etc. In addition, both the automatic driving system 32 and the information output interface 33 are optional configurations.

Figure 4:
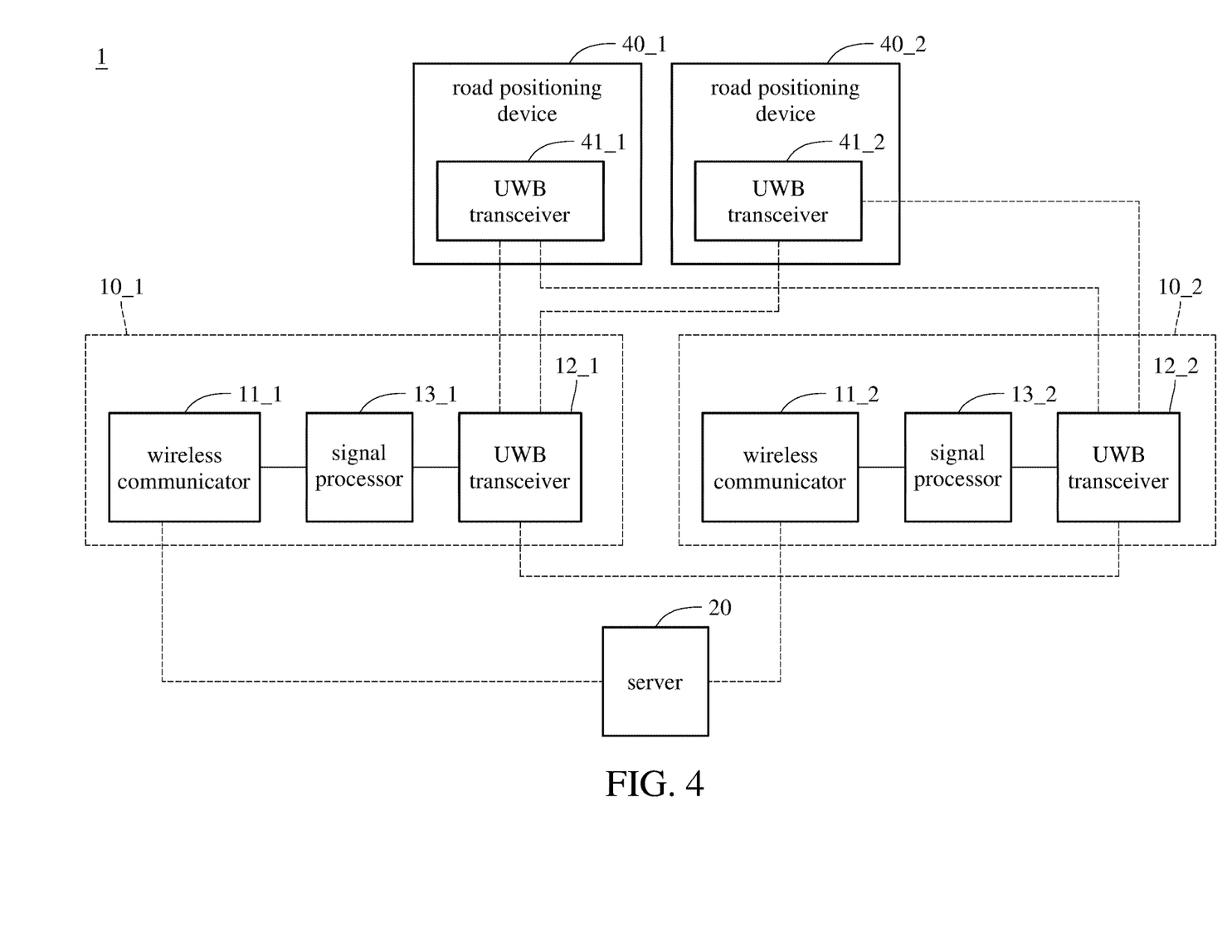
FIG. 4 is a functional block diagram of a vehicle positioning application system according to an embodiment of the present disclosure.

Please refer to FIG. 4 which is a functional block diagram of a vehicle positioning application system according to an embodiment of the present disclosure. As shown in FIG. 4, the vehicle positioning application system 1 includes a plurality of road positioning devices 40_1 and 40_2 (take two as an example), a plurality of vehicle positioning devices 10_1 and 10_2 (take two as an example), and a server 20. The plurality of road positioning devices 40_1 and 40_2 are disposed on a road, and include a first UWB transceiver 41_1 and 41_2, respectively. The plurality of vehicle positioning devices 10_1 and 10_2 are disposed in a plurality of vehicles, respectively, and each of the plurality of vehicle positioning devices 10_1 and 10_2 includes: a wireless communicator 11_1 (or 11_2), at least one second UWB transceiver 12_1 (or 12_2) and a signal processor 13_1 (or 13_2). The at least one second UWB transceiver 12_1 (or 12_2) is configured to receive a pulse signal with source information from at least one of the first UWB transceiver 41_1 and 41_2 and another second UWB transceiver 12_2 (or 12_1). The signal processor 13_1 (or 13_2) is connected to the at least one second UWB transceiver 12_1 (or 12_2) and a speed measuring device of the vehicle, and is configured to generate position information according to the signal value of the pulse signal and the source information, output the position information and vehicle speed information obtained from the speed measuring device through the wireless communicator 11_1 (or 11_2). The server 20 is connected to the plurality of vehicle positioning devices 10_1 and 10_2, and is configured to generate driving information corresponding to each of the plurality of vehicle positioning devices according to the position information and the vehicle speed information of the plurality of vehicle positioning devices, and transmit the driving information to the signal processors 13_1 and 13_2 through the wireless communicators 11_1 and 11_2 of each of the plurality of vehicle positioning devices.

For the cooperation between the vehicle positioning devices 10_1 and 10_2 and the server 20 in the vehicle positioning application system 1 shown in the present embodiment, please refer to the relevant descriptions of FIG. 1 and FIG. 2, and details are not repeated herein. In the present embodiment, the road positioning devices 40_1 and 40_2 can be positioning devices installed on fixed-points on the road, and each road positioning device can pre-store the positioning information of its fixed-point. Specifically, the positioning information may be latitude and longitude information or specific mileage information of a specific road (or may further include information of a specific lane). Each road positioning device includes an UWB transceiver, wherein the UWB transceiver is essentially the same as the UWB transceiver provided in the vehicle positioning device.

Figure 5:
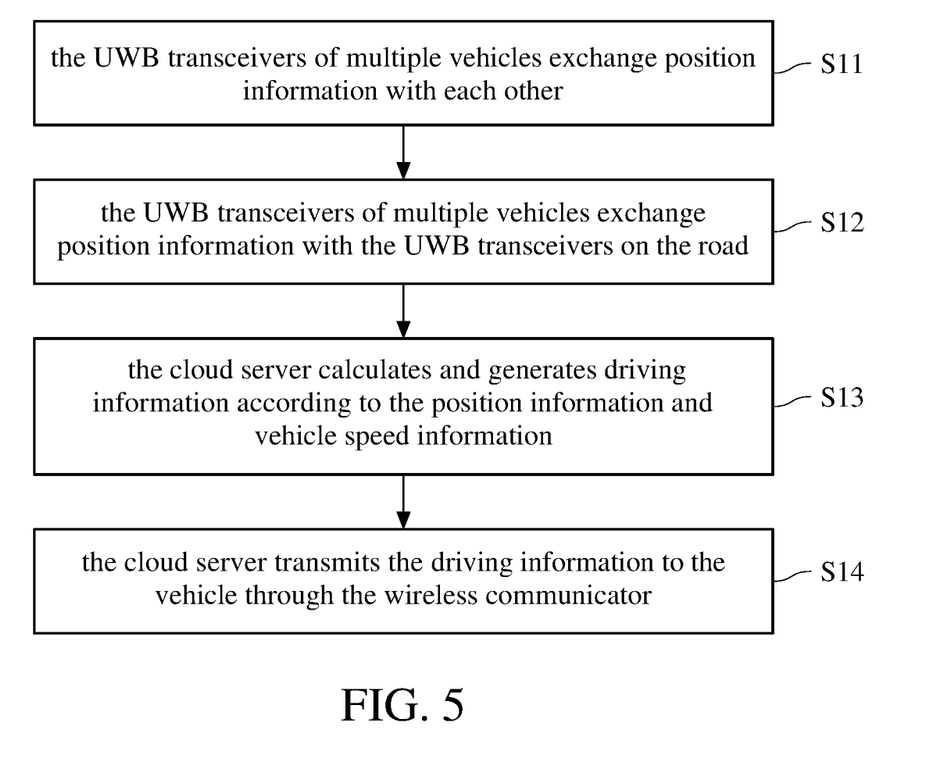
FIG. 5 is an application flowchart of a vehicle positioning application system according to an embodiment of the present disclosure.

Please refer to FIG. 5 which is an application flowchart of a vehicle positioning application system according to an embodiment of the present disclosure. As shown in FIG. 5, the application process of this system may include step S11: the UWB transceivers of multiple vehicles exchange position information with each other; step S12: the UWB transceivers of multiple vehicles exchange position information with the UWB transceivers on the road; step S13: the cloud server calculates and generates driving information according to the position information and vehicle speed information; and step S14: the cloud server transmits the driving information to the vehicle through the wireless communicator. In step S11, multiple vehicles can exchange position information by transmitting and receiving pulse signals containing source information with each other through UWB transceivers, and the signal processor may be configured to mark the position information as relative position information when determining that the source information indicates that the pulse signal is transmitted from one of the vehicles. In step S12, multiple vehicles can exchange position information by transmitting and receiving pulse signals including source information through the UWB transceiver of the vehicle positioning device and the UWB transceiver of the road positioning device, and the signal processor may be configured to mark the position information as absolute position information when determining that the source information indicates that the pulse signal is transmitted from the road. Here, there is no specific sequence relationship between step S11 and step S12, they can also be performed at the same time, or one of them can be optionally performed.

Figure 6:
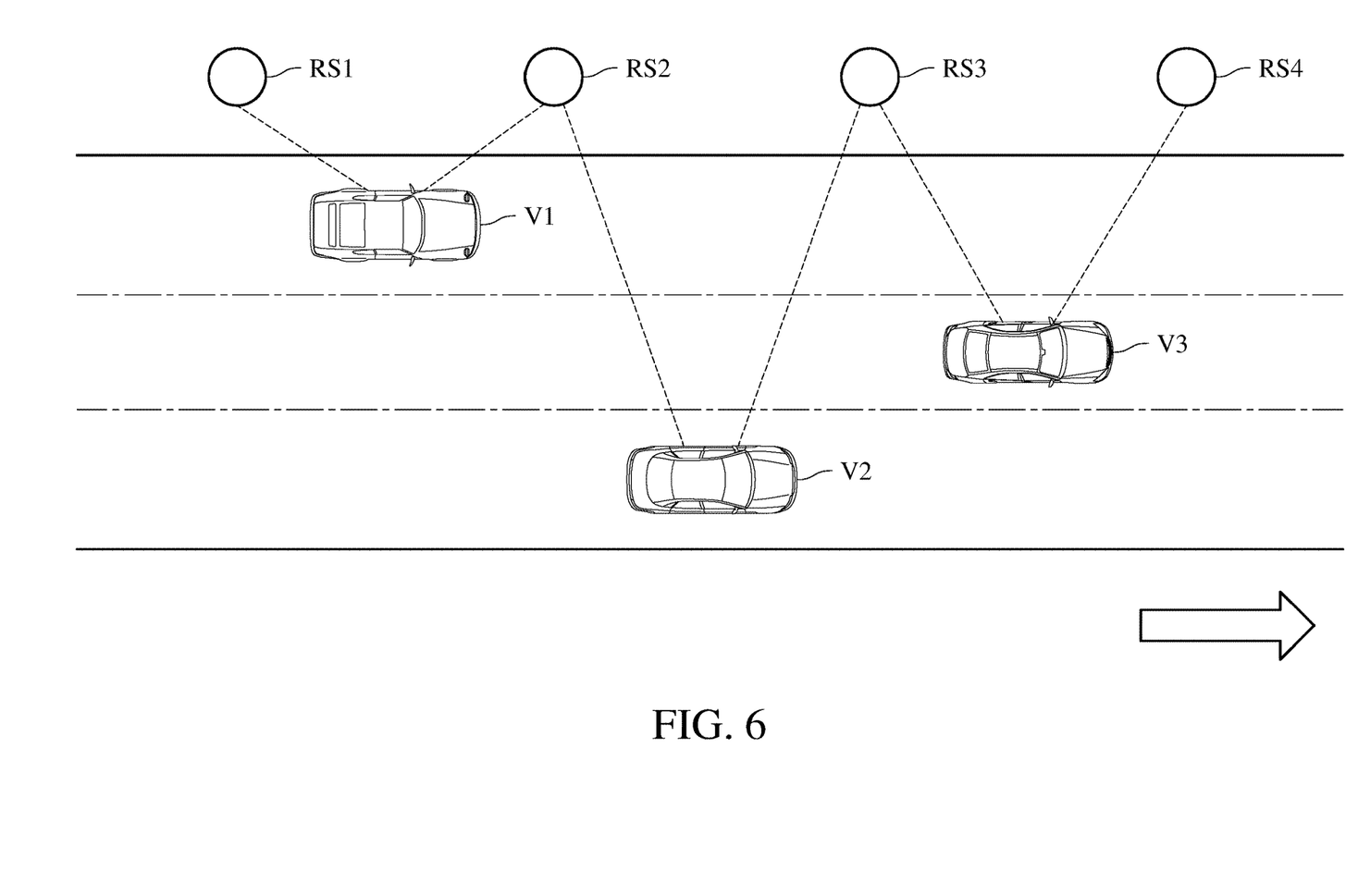
FIG. 6 is a schematic diagram of a vehicle positioning application system according to an embodiment of the present disclosure.
Figure 7:
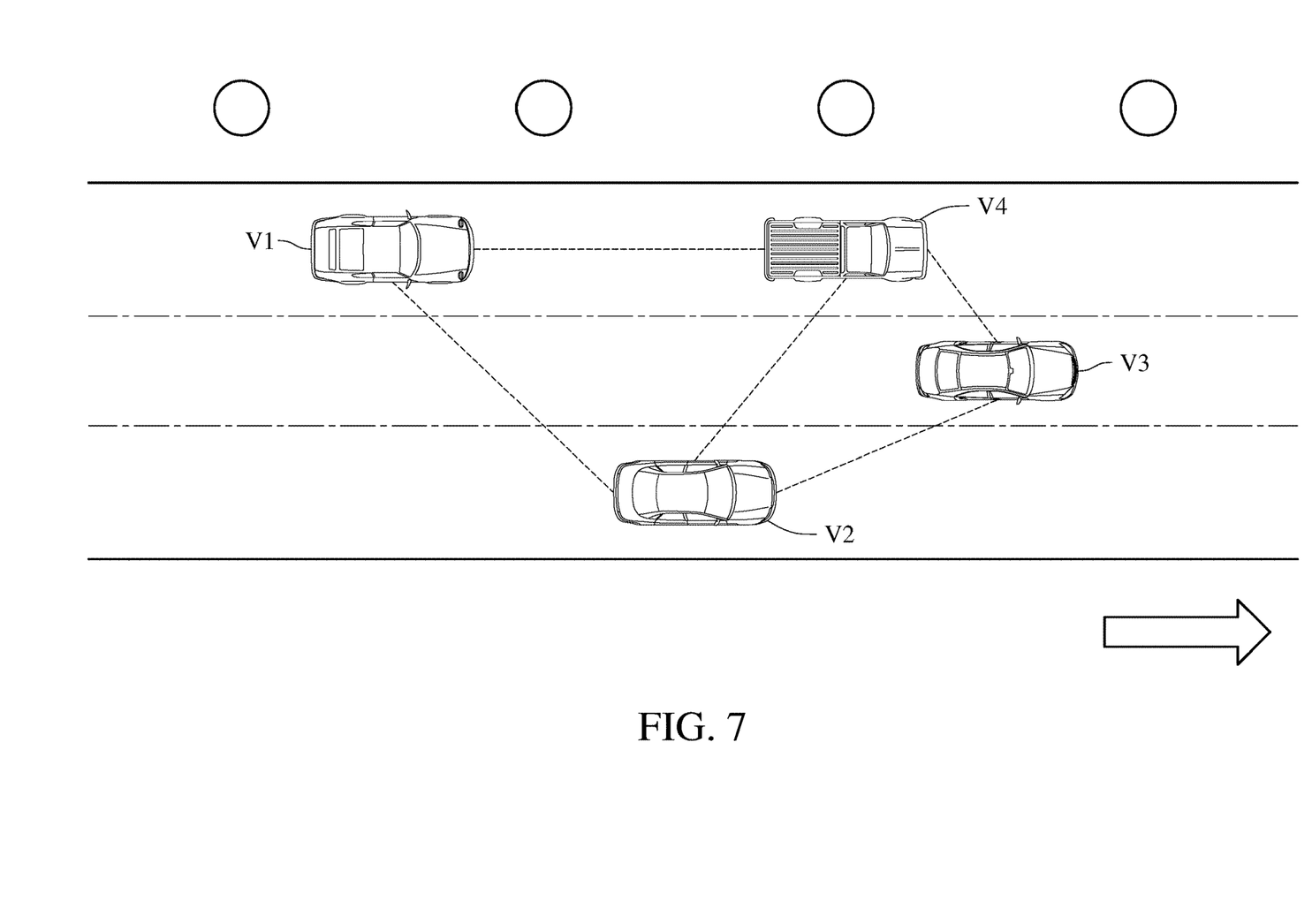
FIG. 7 is another schematic diagram of a vehicle positioning application system according to an embodiment of the present disclosure.

Please refer to FIGS. 6 and 7, FIG. 6 is a schematic diagram of a vehicle positioning application system according to an embodiment of the present disclosure, FIG. 7 is another schematic diagram of a vehicle positioning application system according to an embodiment of the present disclosure. After the signal processor transmits the position information and vehicle speed information to the cloud server through the wireless communicator, that is, in step S13, the cloud server can calculate the absolute position information according to the position information between the vehicle positioning device and the road positioning device, and can calculate the relative position information according to the position information between vehicles, and calculate the driving information according to the absolute position information and the relative position information, wherein the method of obtaining the driving information can be implemented, for example, through an algorithm of current navigation system. In one implementation, when the signal processor transmits the position information (for example, 1 km away from the traffic flow ahead) and vehicle speed information (for example, the current vehicle speed is 90 km/hr) to the server through the wireless communicator, if the server detects that the traffic flow ahead begins to jam, it can transmit back the driving information with deceleration message or lane changing through the wireless communicator, so that the driver can react earlier. As shown in FIG. 6, the road positioning devices are respectively disposed in each of road studs RS1 to RS4 on the road. The vehicle V1 driving on the road can exchange position information with the road positioning devices in the nearby road studs RS1 and RS2 and transmit the data back to the cloud server. The server can further calculate the absolute position of the vehicle V1 on the road based on the position information between the vehicle V1 and road studs RS1 and RS2 with provided position information using triangulation, wherein the absolute position information can include, for example, specific road information, specific lane information, and specific mileage information. The positioning methods of the other vehicles V2 and V3 and the road positioning device are similar and is not repeated herein. It should be noted that the vehicle can be positioned with multiple road positioning devices at a same time, depending on the installation spacing distance of the road positioning devices in practical applications. The distance between the road positioning devices nearby is preferably close to the working distance of the UWB transceiver, for example, about 10 meters, but the present disclosure is not limited thereto.

As shown in FIG. 7, multiple vehicles V1 to V4 can exchange position information with each other and transmit the data back to the cloud server. The cloud server can calculate the relative position of multiple vehicles V1 to V4 on the road based on the position information between vehicles by triangulation. In this way, the cloud server can calculate and generate driving information based on the position information and vehicle speed information and transmit the driving information to the vehicle (as step S14 in FIG. 5). For example, the cloud server can calculate and generate driving information according to the relative position between the vehicles V1 and V4 to remind the driver of the vehicle V1 to prevent from acceleration to maintain the driving distance with the vehicle V4, or calculate and generate driving information according to the relative position among the vehicles V3, V2 and V4 to remind the vehicle V3 to maintain at the same driving direction without a sudden lane change which is more likely to cause danger.

Figure 8:
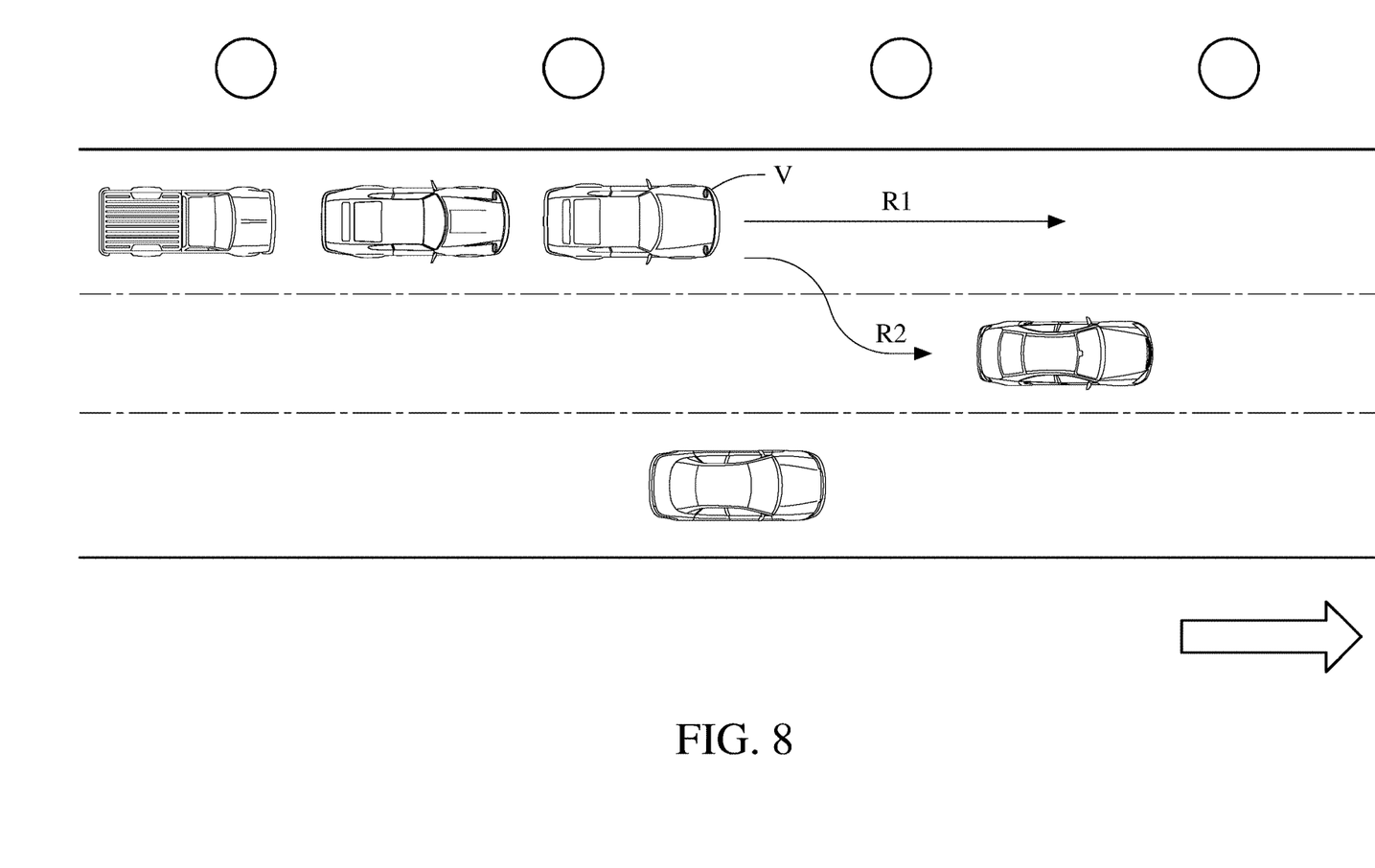
FIG. 8 schematically illustrates an application scenario of a vehicle positioning application system according to an embodiment of the present disclosure.
Figure 9:
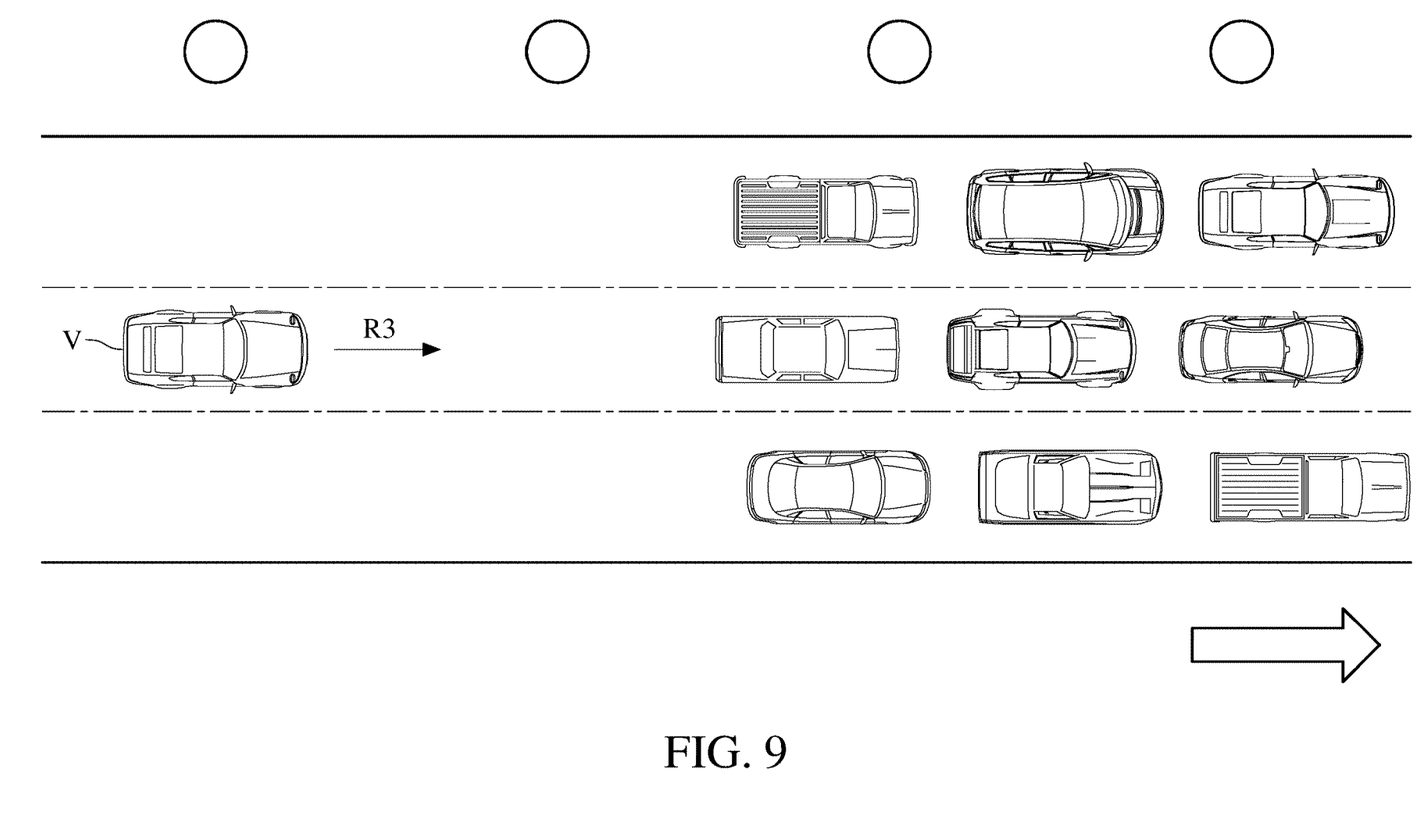
FIG. 9 schematically illustrates another application scenario of a vehicle positioning application system according to an embodiment of the present disclosure.
Figure 10:
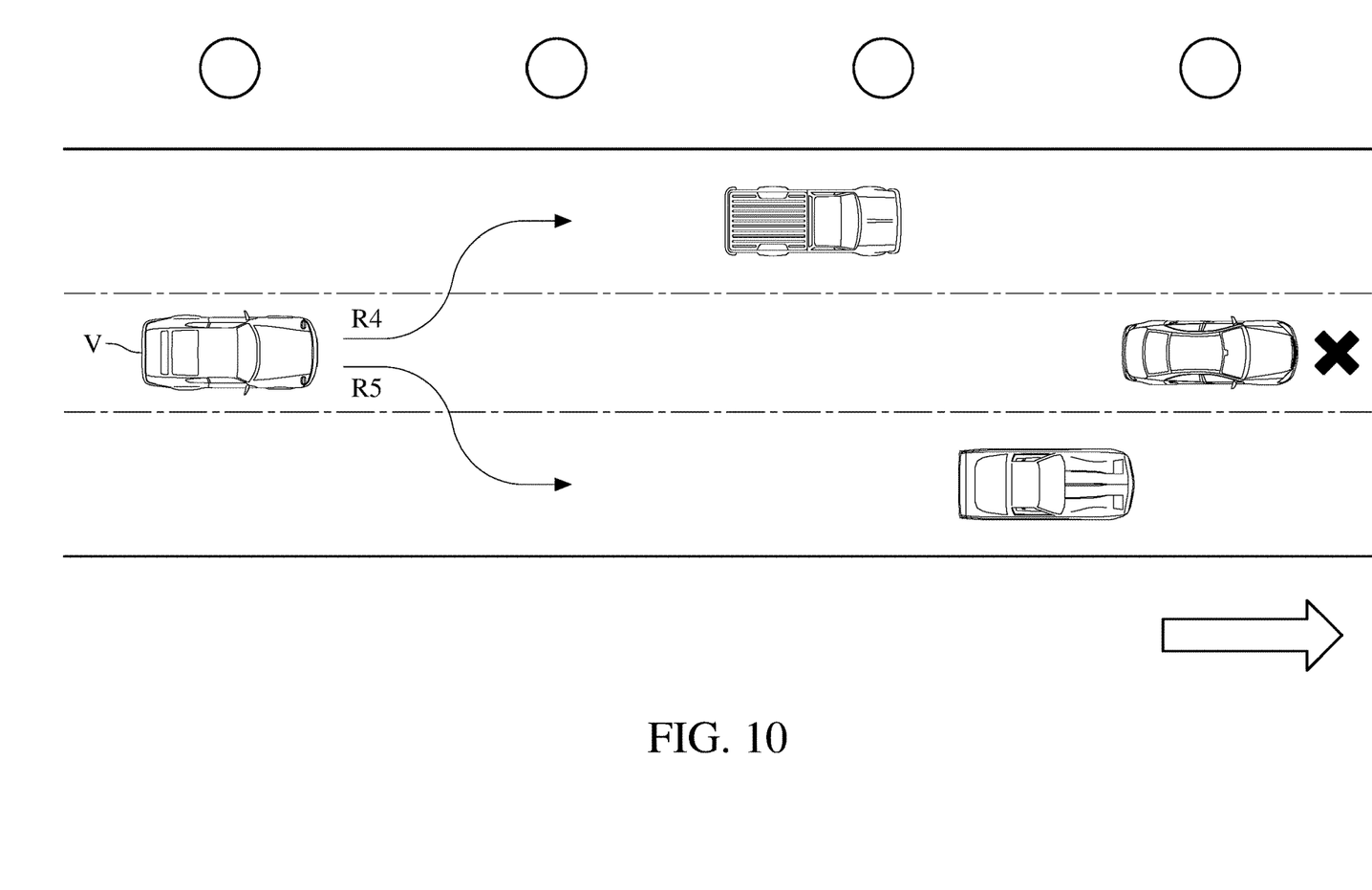
FIG. 10 schematically illustrates yet another application scenario of a vehicle positioning application system according to an embodiment of the present disclosure.

Please refer to FIGS. 8 to 10, which schematically illustrate three application scenarios of a vehicle positioning application system according to an embodiment of the present disclosure. As shown in FIG. 8, when the cloud server detects that the vehicle V is driving too slowly and occupies the inner lane, and there are many vehicles behind and there is no traffic jam ahead, the cloud server can remind driver of the vehicle V with the driving information that he/she can accelerate along the route R1 or change to the outer lane along the route R2. As shown in FIG. 9, when the cloud server calculates and detects that there are many cars in front of the vehicle V and the speed of traffic flow in all lanes start to slow down, the cloud server can remind the driver with the driving information that he/she can start to slow down along the route R3. As shown in FIG. 10, when the cloud server detects that there is a vehicle in a lane ahead with a speed of 0, it is determined that an accident or traffic jam may have occurred, and the cloud server can remind the driver with the driving information that he/she can switch lanes along the route R4 or R5 (or avoid the accident lane).

In one or more embodiments of the present disclosure, the electronic product of the present invention can be applied to vehicle devices, such as autonomous cars, electric cars, or semi-autonomous cars, etc.

In view of the above description, the vehicle positioning device of the present disclosure can use the UWB transceiver installed in the vehicle to communicate with the vehicle itself and another UWB transceiver external to the vehicle to obtain accurate position information, and transmit the position information and vehicle speed information to the server for calculation to obtain accurate traffic conditions and corresponding driving information. The vehicle positioning application system of the present disclosure can use the UWB transceivers installed in the vehicles to provide the position information between vehicles, or/and provide the position information of the vehicle on the road through the UWB transceiver of the vehicle and the UWB transceiver on the road, so that after the server receives the vehicle speed information of each vehicle and the position information mentioned above, it can perform big data calculations to obtain the traffic conditions on the lane and generate corresponding driving information to transmit back to the vehicle. In this way, through the high-precision UWB transceiver (about 10-30 cm precision), the system can distinguish the traffic conditions of different lanes, and then indicate the driving route with better road conditions to the driver to reduce traffic jams or traffic accidents. Furthermore, by using an UWB transceiver with small size and low power consumption, it can be easily installed in various positions of the vehicle and reduce the power consumption of the positioning device.

Although the present invention is disclosed by the aforementioned embodiments, they are not intended to limit the present invention. Without departing from the spirit and scope of the present invention, all changes and modifications are within the scope of claims of the patent. For the scope of protection defined by the present invention, please refer to the appended scope of patent application.

What is claimed is:

1. A vehicle positioning device, comprising:
   a wireless communicator;
   at least one ultra-wideband (UWB) transceiver disposed in a vehicle, and configured to receive a pulse signal with source information from another UWB transceiver; and
   a signal processor connected to the at least one UWB transceiver and a speed measuring device of the vehicle, and configured to generate position information according to a signal value of the pulse signal and the source information, transmit the position information and vehicle speed information obtained from the speed measuring device to a server through the wireless communicator, and receive driving information associated with the position information and the vehicle speed information from the server through the wireless communicator.

2. The vehicle positioning device of claim 1, wherein the signal processor is further connected to an automatic driving system of the vehicle, and is further configured to control the automatic driving system according to the driving information.

3. The vehicle positioning device of claim 1, wherein the signal processor is further connected to an information output interface, and is further configured to generate a notification according to the driving information and output the notification through the information output interface.

4. The vehicle positioning device of claim 1, wherein the at least one UWB transceiver is a plurality of UWB transceivers, and the plurality of UWB transceivers are disposed on two sides of a front end and two sides of a rear end of the vehicle, respectively.

5. A vehicle positioning application system, comprising:
   a plurality of road positioning devices disposed on a road, and each of the plurality of road positioning devices comprising a first ultra-wideband (UWB) transceiver;
   a plurality of vehicle positioning devices disposed in a plurality of vehicles, respectively, and each of the plurality of vehicle positioning devices comprising:
     a wireless communicator;
     at least one second UWB transceiver configured to receive a pulse signal with source information from at least one of the first UWB transceiver and another second UWB transceiver; and
     a signal processor connected to the at least one second UWB transceiver and a speed measuring device of the vehicle, and configured to generate position information according to a signal value of the pulse signal and the source information, output the position information and vehicle speed information obtained from the speed measuring device through the wireless communicator, and
   a server connected to the plurality of vehicle positioning devices, and configured to generate driving information corresponding to each of the plurality of vehicle positioning devices according to the position information and the vehicle speed information of the plurality of vehicle positioning devices, and transmit the driving information to the signal processor through the wireless communicator of each of the plurality of vehicle positioning devices.

6. The vehicle positioning application system of claim 5, wherein the signal processor is configured to mark the position information as relative position information when determining that the source information indicates that the pulse signal is transmitted from one of the plurality of vehicles, and mark the position information as absolute position information when determining that the source information indicates that the pulse signal is transmitted from the road.

7. The vehicle positioning application system of claim 5, wherein the signal processor is further connected to an automatic driving system of one of the plurality of vehicles, and is further configured to control the automatic driving system according to the driving information.

8. The vehicle positioning application system of claim 5, wherein the signal processor is further connected to an information output interface of one of the plurality of vehicles, and is further configured to generate a notification according to the driving information and output the notification through the information output interface.

9. The vehicle positioning application system of claim 5, wherein the at least one second UWB transceiver is a plurality of second UWB transceivers, and the plurality of second UWB transceivers are disposed on two sides of a front end and two sides of a rear end of the vehicle, respectively.

10. The vehicle positioning application system of claim 5, wherein each of the plurality of road positioning devices is disposed in a road stud on the road.

* * * * *